United States Patent [19]
Hayes

[11] Patent Number: 5,633,541
[45] Date of Patent: May 27, 1997

[54] MAGNETOHYDRODYNAMIC ELECTRIC GENERATOR

[75] Inventor: James C. Hayes, Brossard, Canada

[73] Assignee: Hu L. Foo, Brossard, Canada

[21] Appl. No.: 385,708

[22] Filed: Feb. 8, 1995

[51] Int. Cl.[6] .................. H02K 44/00; G21D 7/02
[52] U.S. Cl. ............................. 310/11; 372/90
[58] Field of Search ..................... 310/11; 372/90, 372/82, 89, 37, 55, 61, 81

[56] References Cited

U.S. PATENT DOCUMENTS

| | | | |
|---|---|---|---|
| 3,418,206 | 12/1968 | Hall et al. | 376/132 |
| 3,898,584 | 8/1975 | Born | 372/90 |
| 4,206,429 | 6/1980 | Pinsley | 372/90 |
| 4,426,705 | 1/1984 | Stevison et al. | 372/58 |
| 4,500,803 | 2/1985 | Hayes | 310/11 |
| 4,602,372 | 7/1986 | Sasaki et al. | 372/58 |

*Primary Examiner*—Steven L. Stephan
*Assistant Examiner*—Jonathan Link
*Attorney, Agent, or Firm*—Robic

[57] ABSTRACT

A magnetohydrodynamic electric generator is disclosed, which is so devised that the coherent light generated in it by electrical stimulation, heat induction and/or gas expansion is collected and focused towards the gas plasma moving between the magnets and the electricity-collecting plates. In this generator, the composition of the laser gas mixture is also controlled and adjusted to compensate for the unavoidable loss occurring in operation, when some of the gas molecules, especially $CO_2$, are dissociated.

16 Claims, 4 Drawing Sheets

MAGNETOHYDRODYNAMIC ELECTRIC GENERATOR

BACKGROUND OF THE INVENTION

1. Field of the Invention

The present invention relates to an improved, magnetohydrodynamic (MHD) electric generator and to its use in a hybrid engine for converting the thermal energy of fuel and/or the thermal energy stored in air into electrical energy with a high thermodynamic efficiency and a high rate of energy conversion.

More particularly, the invention is concerned with an improvement to the MHD generator and hybrid engine disclosed in U.S. Pat. No. 4,500,803 issued on Feb. 19, 1985 in the name of the present inventor.

2. Brief Description of the Prior Art

The above mentioned U.S. Pat. No. 4,500,803 discloses a MHD generator wherein a gas flowing in a closed cycle is photoionized by a laser and passed through a magnetic field in order to produce electricity between a pair of electrodes that are perpendicular to the flow of gas and to the magnetic field, respectively. The laser used to photoionize the gas of the MHD generator is a gas-laser which combines a divergent nozzle to make the gas to laser by expansion, and a radio frequency generator to make the gas to laser by electric stimulation. The gas-laser also comprises an optical system for collecting the laser light and for focusing it on the flow of gas upstream the electrodes and magnetic field. This optical system includes a first pair of mirrors upstream and downstream the gas flow respectively, for focusing the laser light in the axial direction of the gas flow. It also includes an optical sub-system for collecting the laser light in a direction transversal to the gas flow and another pair of focusing mirrors for focusing the laser light collected by the sub-system in a direction transversal to the gas flow. A heat-exchanger is provided for heating the gas before it passes through the electrodes. A compressor is also provided for circulating the gas through the closed cycle.

U.S. Pat. No. 4,500,803 also discloses the combination of the above mentioned MHD generator with a conventional, open-cycle fuel engine. The resulting structure forms a hybrid engine for converting the thermal energy of a fuel and/or the thermal energy stored in air into electrical energy with a high thermodynamic efficiency and a high rate of energy conversion. In this particular combination, the open-cycle fuel engine comprises in series a combustion chamber through which air and fuel are burnt, the heat-exchanger of the MHD generator and a heat-engine for operating the compressor of the MHD generator.

SUMMARY OF THE INVENTION

After further study and testing carried out on the MHD electric generator disclosed in the above patent, the present inventor has surprisingly discovered that his former invention could substantially be improved in terms of efficiency if the coherent light generated by electrical stimulation, heat induction and/or gas expansion is collected and focused towards the gas plasma moving between the magnets and the electricity-collecting plated. The inventor has also discovered that substantial improvements are also achieved if the composition of the laser gas mixture is suitably controlled and adjusted to compensate for the unavoidable loss occurring in operation, when some of the gas molecules, especially $CO_2$, are dissociated.

Thus, in accordance with the invention, there is provided a magnetohydrodynamic (MHD) electric generator comprising a S-shaped duct having one end acting as an inlet for a laser gas mixture fed under pressure at a temperature higher than 1100° C. The duct has three spaced-apart portions that extend across and along a common axis.

The first one of these portions is close to the inlet and extends across the common axis. It is devised to define a first laser-generating zone in which the laser gas mixture is made to laser. The first portion is also devised to form a first optical cavity comprising a first pair of opposite mirrors that are aligned with the common axis and adjusted to focus the coherent light that they collect. One of the mirrors of this first pair, viz. the one adjacent the second one of the portions, is a partial mirror to allow the coherent light generated and collected in the first zone to be transmitted toward the second one and third one of these duct portions along the common axis.

The second portion of the duct is located past a divergent nozzle downstream of the first portion and also extends across the common axis. This second portion defines a second laser generating zone in which the laser gas mixture is made to laser by expansion. This second portion is also devised to form a second optical cavity comprising a second pair of opposite mirrors that are aligned with the common axis and adjusted to focus the coherent light that they collect. Both of the mirrors of the second pair are partial mirrors to allow the coherent light collected in the first zone to enter the second zone and to increase the coherent light collected in the second zone, and then the so-increased coherent light to be transmitted to the third portion of the duct.

The third portions of the duct is aligned with the common axis and oriented to face the first and second portions of this duct. This third portion is devised to form a third, axially elongated optical cavity comprising a third pair of mirrors that are aligned with the common axis and adjusted to focus the coherent light coming from the first and second zones into an axially positioned spot which ionizes the gas mixture passing through the third portion and thus converts the same to a plasma. One of the mirrors of this third pair, viz. the one adjacent the second portion of the duct, is a partial mirror to allow the coherent light to enter into the third portion.

The MHD electric generator also comprises a plurality of permanent magnets extending along the third portion of the duct. Each magnet has positive and negative poles symmetrically positioned with respect to the common axis.

The MHD electric generator further comprises a plurality of electricity-collecting plates extending along the third portion of the duct. These plates are grouped in pairs symmetrically positioned with respect to the common axis so as to be perpendicular to both the gas mixture flowing through the third portion of the duct along the common axis and the magnets. Each of the plates is connectable to a load and supports a winding that is also connectable to the load, In use, when a gas mixture is fed into the duct and made to laser in the first and second portions thereof, electricity is generated in the third portion of the duct, a very efficient manner by conventional magnetohydrodynamic action and simultaneously by Faraday effect.

The first portion of the duct may be operatively connected to a radio-frequency generator in order to make the gas mixture to laser by electrical stimulation through radio-frequency induction in the first portion or by straight electrical discharge.

The first portion of the duct may also be operatively connected to a gas burner in order to make the gas mixture to laser by burning.

Advantageously, the MHD generator may further comprises a gas control device including at least one gas sensor located within the duct in order to check the composition of the gas mixture and give a signal to control the same. Such a control device is preferably devised so that the laser gas mixture fed into the inlet of the duct is adjusted to contain from 88 to 89% $N_2$, from 8 to 10% $CO_2$ and less than 4% $H_2O$.

In accordance with the invention, there is also provided a hybrid engine for converting the thermal energy of fuel and/or the thermal energy stored in air into electrical energy with a high thermodynamic efficiency and a high rate of energy conversion. This hybrid engine comprises in combination:

(a) a closed cycle MHD electric generator system comprising, in series, an improved MHD generator as disclosed above and a compressor to feed the laser gas mixture into the MHD generator via a heat exchanger, the system also comprising a laser gas chamber generator to generate the laser gas mixture and heat the same, the closed cycle and a scrubber; and (b) an open-cycle fuel engine comprising, in series, a combustion chamber through which air and fuel are burnt, the heat-exchanger of the MHD generator system and a heat-engine for operating the compressor of the MHD generator system.

The invention will be better understood upon reading the following non-restrictive description of two preferred embodiments thereof, made with reference to the accompanying drawings.

DESCRIPTION OF A PREFERRED EMBODIMENT

Figure 2:
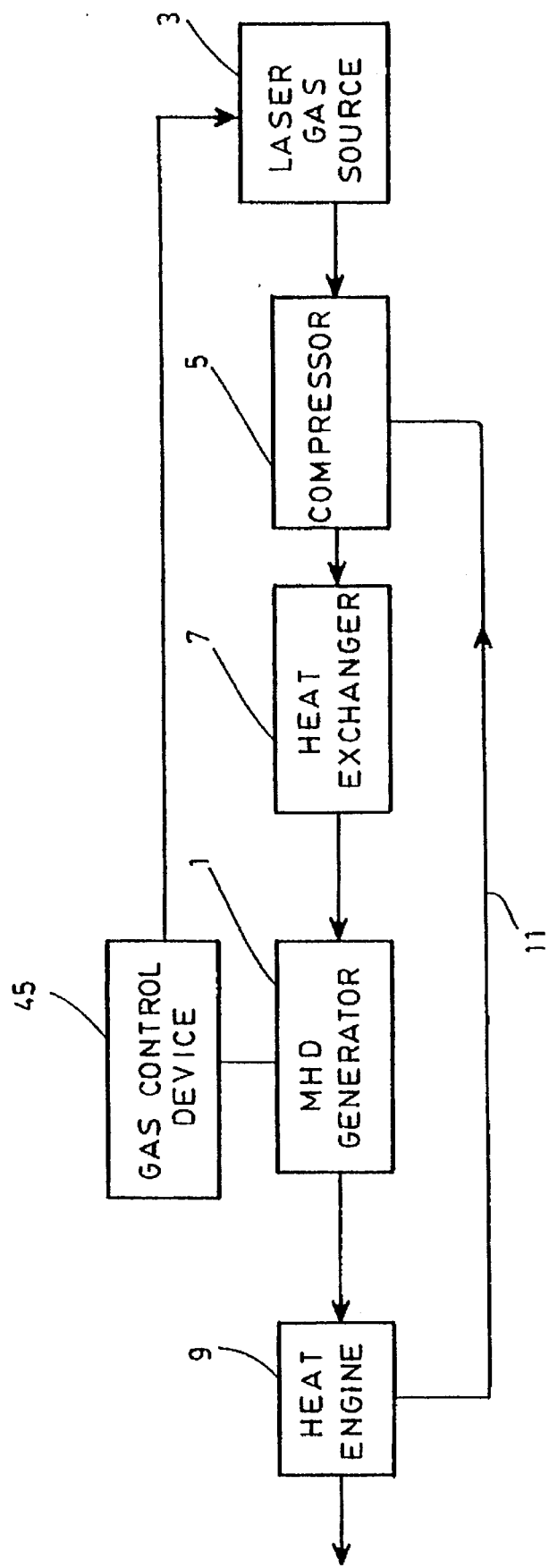
FIG. 2 is a block diagram showing the MHD generator of FIG. 1 with the other elements required to operate the same.

As is shown in FIG. 2, the magnetodynamic (MHG) electric generator 1 according to the first preferred embodiment of the invention, is intended to be fed with a laser gas mixture which preferably consists of from 88 to 89% $N_2$ and from 8 to 10% $CO_2$, the balance being $H_2O$. Such a laser gas mixture comes from a laser gas source 3 which may consist of a holding tank (not shown) or of a burner in which $C_6H_6$ is burnt with $N_2O$, or $C_6H_{10}$ or $C_6H_{12}$ is burnt with air. This kind of laser gas mixture is known for its efficiency and the way it can be produced industrially is known in the art and need not be further described.

The laser gas mixture coming from the laser gas source 3 enters into a compressor 5 which feeds it to the MHD generator 1 under a pressure of about 140 Psi (about 10 atm). The compressor 5 is ran by an external power source as will be described hereinafter. Before entering the MHD generator, the laser gas mixture leaving the compressor 5 passes through a heat exchanger 7 whose purpose is to heat the mixture to a temperature higher than 1100° C. if such is needed, viz. if the laser gas mixture coming from the laser gas source 3 and compressor 5 is not already at a temperature sufficient to achieve the requested laser efficiency.

The laser gas mixture which leaves the MHD generator 1 passes through a heat engine 9 which may be a turbine or a sterling engine. The purpose of this heat engine 9 is essentially to recover as much energy as possible from the laser gas mixture leaving the MHD generator 1 and to transmit this recovered energy back to the compressor 5 via a power driving shaft 11.

Figure 1:
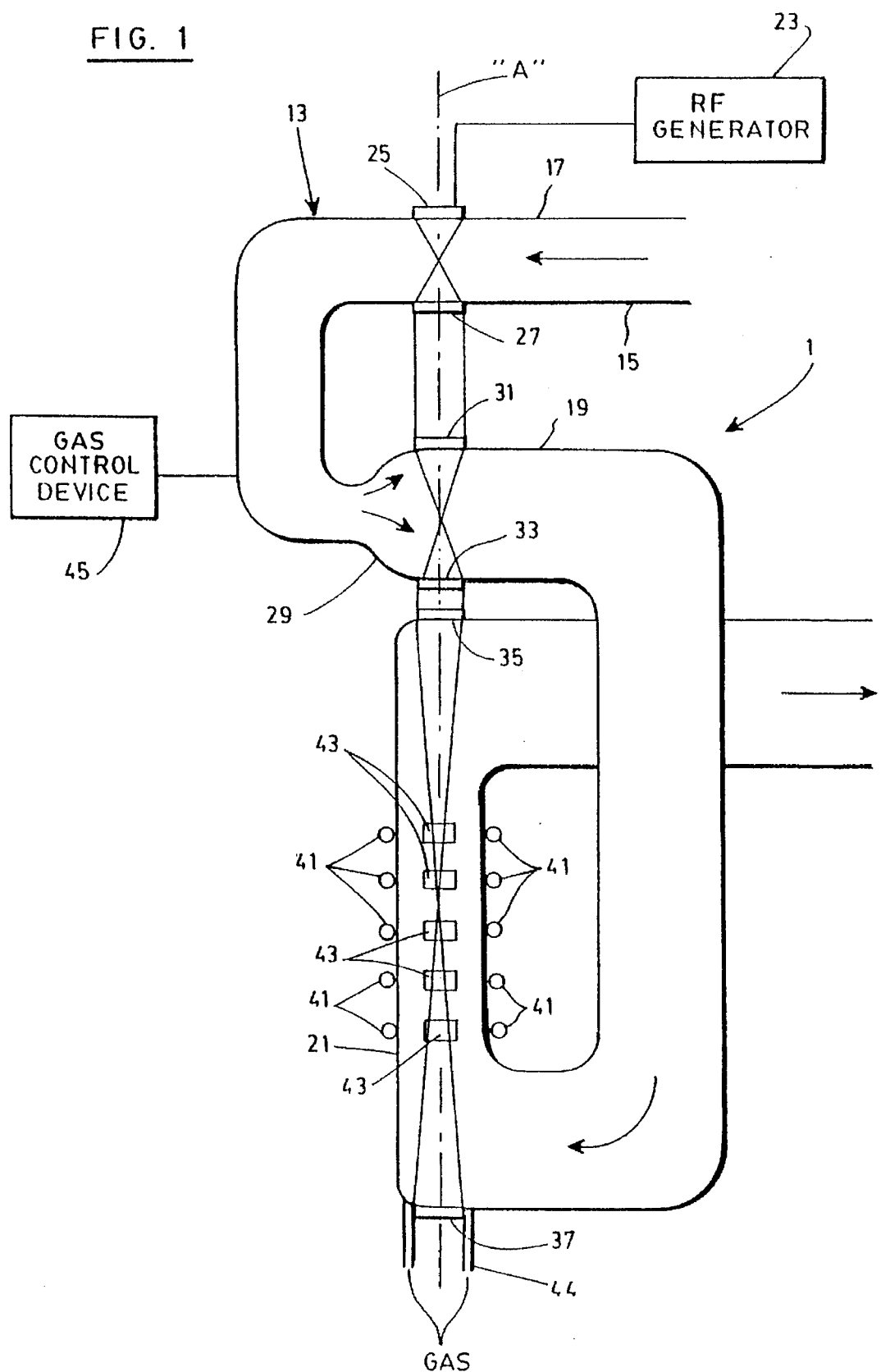
FIG. 1 is a diagrammatic representation of an improved MHD generator according to a first preferred embodiment of the invention.

Referring now to FIG. 1, the MHD generator 1 according to the first preferred embodiment invention comprises a S-shaped duct 13 having an inlet 15 through which the selected laser gas mixture at the required temperature and pressure is fed. Due to this shape, the duct 13 has three spaced-apart portions numbered 17, 19 and 21, respectively, that extend across and along a common axis "A".

The first portion 17 is close to the inlet 15 and extends across the axis "A". It is devised to define a first laser-generating zone in which the laser gas mixture is made to laser by electrical stimulation or by radio-frequency (RF) induction obtained with a RF generator 23 connected to a ring laser cavity, a curved mirror cavity or a hole couple cavity. This kind of equipment is well known in the art and needs not be further described. The first portion 17 of the duct is also devised to form a first optical cavity. For this purpose, the first portion 17 comprises a pair of opposite mirrors 25 and 27 that may be water cooled and are aligned with the axis A and adjusted to focus the coherent light that they collect. The mirror 25 on top of the S-shaped duct is a plain mirror. The mirror 27 which faces the mirror 25, is a partial mirror which can be a spherical Brewster glass, gap mirror acting as a transverse mode laser output and microwave adjuster. This mirror 27 allows the coherent light generated between the mirrors 25 and 27 in the first portion 17 of the duct to be collected in the transverse direction and transmitted towards the second and third portions 19 and 21 of the duct, as will now be explained.

The laser gas mixture leaving the first portion 17 of the duct 13 then passes through a divergent nozzle 29 which extends upstream of the second portion 19 of the duct. The gas expanding through this nozzle 29 is made to laser by expansion in the second portion 19 of the duct, thereby defining a second laser-generating zone. Like the first zone, the second laser-generating zone is devised to form a second optical cavity. For this purpose, it comprises a pair of opposite partial mirrors 31 and 33 are aligned with the axis A and adjusted to focus the coherent light that they collect downstream the divergent nozzle 29. These partial mirrors 31 and 33 are light conductive and may also be water cooled. They allow the coherent light that is generated in the first zone to pass therethrough and thus to "increase" the coherent light in the second laser-generating zone.

Finally, the laser gas mixture leaving the second portion 19 reaches the third portion 21 of the S-shaped duct, which, contrary to the first and second portions 17 and 19, is not transverse to but aligned with the axis A, and oriented so as to face these first and second portions, as is clearly shown in FIG. 1. Once again, the third portion 21 is devised to form a third, axially elongated optical cavity. For this purpose, it comprises a pair of opposite mirrors 35 and 37 which are aligned with the axis A and adjusted to focus the coherent light coming from the first and second laser-generating zones into a spot 39 which is of course located on the axis A. Of course, to allow the coherent light to enter the third portion 21, the mirror 35 which is adjacent the second portion 19 must be light conductive. The other mirror 37 may be plain and both of them may be water cooled, if need be.

As is shown, the sides of the third portion 21 of the duct 13 are lined with a plurality of permanent magnets 41 whose positive and negative poles are symmetrically positioned with respect to the axis A. The sides of the third portion 21 of the duct are also lined with a plurality of winding-supporting plates 43 that are preferably segmented and extend in pairs symmetrically positioned with respect to the axis "A".

As can be now understood, the spot 39 is generated by all the coherent light that is collected and focused in the first and second portions 17 and 19, of the duct and then transferred in a form of a laser beam coaxial to the axis A into the third portion 21 of the duct via the mirrors 27, 31, 33 and 35. The spot 39 obtained by focusing the laser beam with the mirrors 35 and 37 ionizes the gas moving through this third portion 21 along the axis A and thus generates a plasma that passes between the magnets 41 and plates 43 that extend perpendicularly to each other and to the axis A. This results in turn in the generation of electricity by conventional magnetohydrodynamic action, the generated current being collected and supplied to a load (not shown) by the plates 43 that are perpendicular to both the gas flow and the magnets 41.

As can also be understood, the plasma generated by the spot 39 which is itself generated by the laser beam entering the third portion 21 of the duct, may move along the axis A towards the laser source (viz towards the first and second optical cavities defined by the first and second portions 17 and 19 of the duct). This motion of the plasma towards the laser beam is particularly interesting since it generates additional electricity by Faraday effect. This additional electricity is collected in the windings (not shown) surrounding the plates 43 and also supplied to the load.

As can further be understood, the conductivity of the plasma changes with temperature and goes from transparent to opaque. In the latter case, there is no energy entry to keep the structure of the plasma which becomes transparent again. Then, a new spot is formed and starts at the bondary to move again forwards. Of course, such is repeated permanently while the MHD generator is in operation. Thus, the particular structure of the MHD generator 1 makes it possible for the spot 39 to move within the third portion 21 of the duct. Since any motion of the spot 39 will necessarily be along the axis A, additional energy will permanently be generated by Faraday effect, as was explained above. If necessary, storage capacitors may also be provided to neutralize back current when the spot moves backwards.

In order to generate as much energy as possible, it is important that the density of the gas mixture passing through the third portion 21 of the duct be high. To achieve such a requirement, one may either narrow the diameter of the third portion of the duct as is shown in FIG. 1, or provide one or more additional gas injectors 44 at the inlet of the third portion to increase the amount of gas passing through this portion. Advantageously, such injectors may be located to inject the gas close to the inner walls of the third portion so as to "shield" the magnets and collecting plates 43.

As aforesaid, it is important that the laser gas mixture contains from 88 to 89% $N_2$, from 8 to 10% $CO_2$, and less than 4% to achieve a high efficiency. In operation, it has been found that the composition of the laser gas mixture may substantially vary over the time, especially if the gas mixture is recycled, since the laser beam "hitting" the $CO_2$ molecules decomposes the same. To ensure that the composition of the laser gas mixture fed into the MHD generator 1 remains correct, use can be made of a gas control device 45 including one or more gas sensors that can be located into the duct 13 between the first and second portions 17 and 19 of it, in order to check the amount of $CO_2$ and/or $N_2$ and/or $H_2O$ present in the composition and to adjust accordingly the laser gas source 3 (see FIG. 2).

Figure 3:
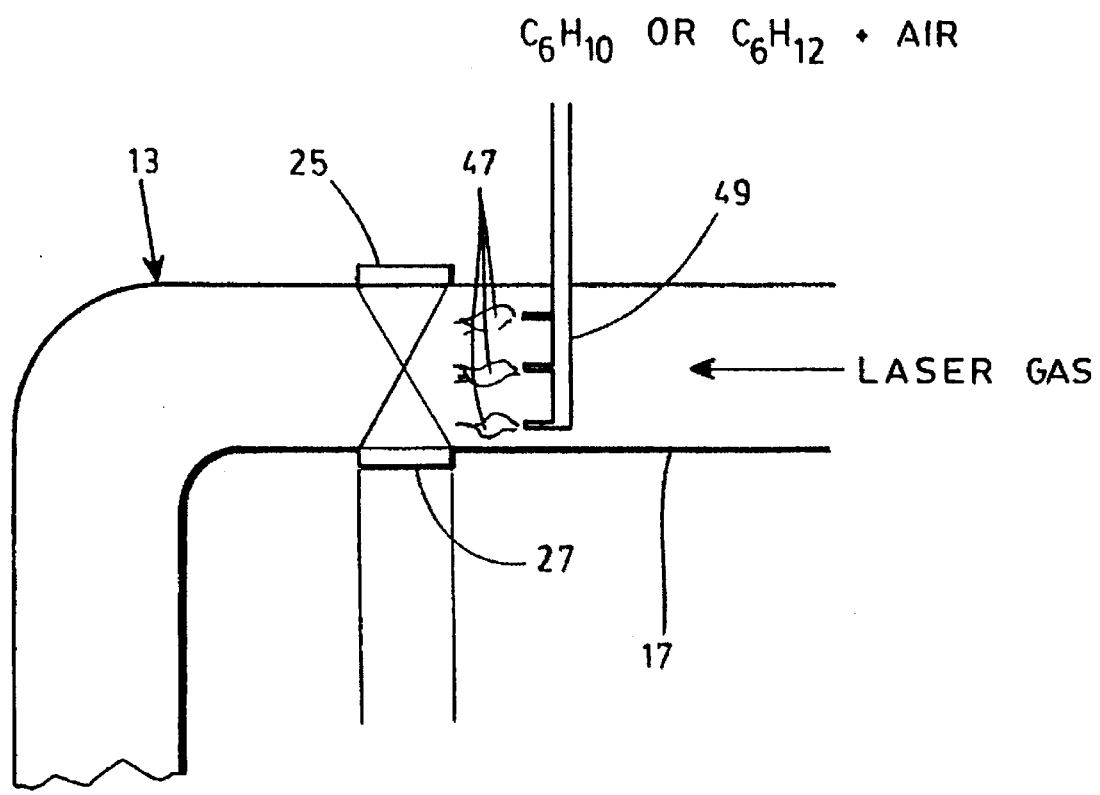
FIG. 3 is a diagrammatic representation of the inlet of an improved MHD generator according to a second preferred embodiment of the invention.

Referring now to FIG. 3, the MHG electric generator 1' according to the second preferred embodiment of the invention is very similar to the one shown in FIG. 1. For this reason, the same structural elements have been identified with the same reference numeral as in FIG. 1. As a matter of fact, the only difference between this second preferred embodiment and the first one lies in the kind of means used to make the gas mixture to laser in the first laser-generating zone defined by the first portion 17 of the duct 13. Instead of electrically stimulating the gas mixture, the gas mixture is stimulated by the heat generated by the flame 47 of a gas burner 49 (see FIG. 4) in the first optical cavity. This alternative technique is particularly interesting since:

(1) it does not require electricity and thus does not affect the net electrical efficiency of the whole system;

(2) it ensures that the gas entering the generator 1 is at the required elevated temperature, thereby making it optional to have a heat exchanger 7 mounted upstream the MHD generator as is shown in FIG. 1; and (3) it can be used to adjust and/or correct the concentration of the laser gas mixture, thereby making it optional to have the laser gas source 3 controlled by the gas control system 45.

As aforesaid, whatever be the selected embodiments of the invention, the gas is circulated through the duct 13 of the MHD generator by the compressor 5 which is ran by an external power source. The gas leaving the heat engine 9 may also be recycled to the laser gas source 3 in order to form a closed lop or cycle 51 (see FIG. 4). In such a case, a scrubber 53 opening to the atmosphere may be provided to ensure that the amount of gas within the closed loop remains constant even when additional gas is introduced therein by the laser gas source or burner in order to adjust the concentration of the laser gas mixture entering the MHD generator. In any event, it will be understood that, in such a case, since the gas circulates in a closed cycle, the thermodynamical efficiency of the system is very good as compared to the known generators.

Figure 4:
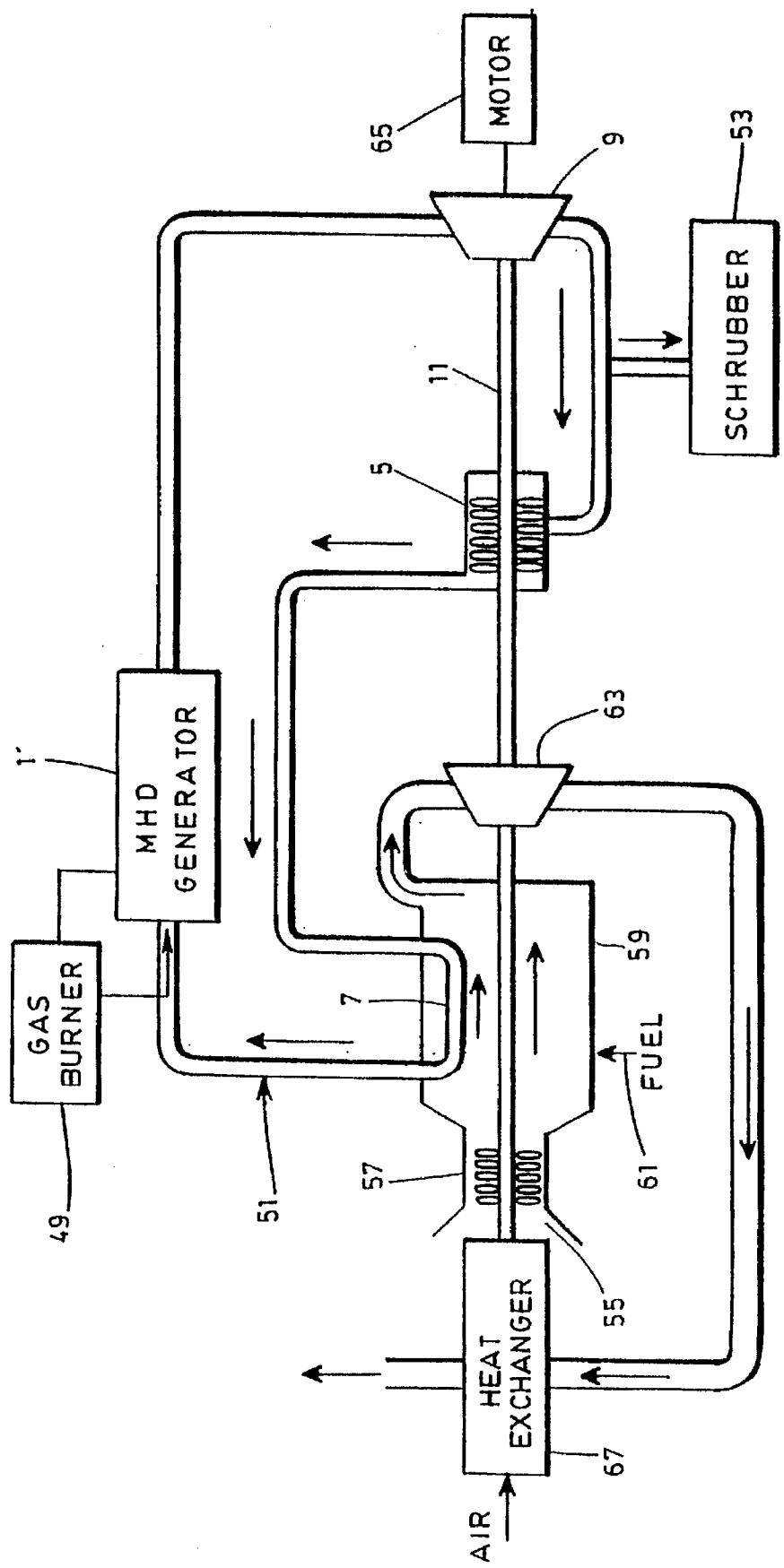
FIG. 4 is a diagrammatic representation of a hybrid engine combining the MHD generator of FIG. 2 with a fuel engine.

According to another aspect of the invention which is shown in FIG. 4, the external power source required to operate the compressor 5 may advantageously consists of an open-cycle fuel engine using the thermal energy of fuel and/or air in an open cycle as source of power for the compressor 5 and as source of heat for the heat exchanger 7.

This open cycle fuel engine may comprise an air intake 55 through which air is brought in from the exterior. This air may already have thermal energy stored in it from a solar collector, a wind collector or both of them. However, it may also just be ordinary air.

This air is sent through a compressor 57 into a combustion chamber 59 in which it is burnt with fuel if the air does not have enough stored energy. The combustion chamber 59 is connected to, or incorporates the heat exchange 7 in which the gas laser mixture circulating into the closed cycle 51 is heated. The fuel is fed to the combustion chamber from a storage tank (not shown) via a fuel line 61 as is known per se. The hot combustion gas and/or air leaving the combustion chamber 59 are fed to a heat engine 63 which may consist of a turbine or a sterling engine, in order to extract energy to run the compressor 57. The extracted energy is also used to run the compressor 5 of the closed cycle 51 via a driving shaft.

It should be noted that when turbines are used as heat engines, all the compressors and turbines can advantageously be mounted on the same shaft 11 as shown in FIG. 4 and both cycles can be started simultaneously by a starting motor 65 also mounted on the same shaft 11. It should also be noted that the exhaust gases and/or air from the heat engine 63 can also be used to heat the incoming air of the cycle through an additional heat exchanger 67 in order to enhance again the efficiency of the hybrid engine.

The above described hybrid engine is very efficient to convert the thermal energy of fuel and/or the thermal energy stored in air into electrical energy. As the temperature of the laser light is high as compared to the exhaust temperature, its thermodynamic efficiency is high.

Moreover, as fuel is burned in an external combustion chamber 59, the temperature and pressure of the engine may be controlled. Thus, pollution can also be controlled and reduced. Any fuel may be used, even coal, thereby making the invention particularly useful in some countries where coal is readily available and electricity is not. If coal is used as a heat source in the combustion chamber, the exhaust may not be fed directly into the heat turbine because coal fly problem would damage the blades. Thus, in this case, a heat exchanger using air would be used to transfer thermo-energy to turbine and compressor.

The above described engine is easily scalable. Therefore, it can output power from watts to megawatts.

Of course, various changes may be made in the shape, size, and arrangement of the engine parts. For example, equivalent elements may be substituted for those illustrated and described herein and parts may be reversed. Moreover, certain features of the invention may be utilized independently of the use of other features all without departing from the spirit or scope of the invention as defined in the appended claims.

I claim:

1. A magnetohydrodynamic (MHD) electric generator comprising:

(a) a S-shaped duct having one end acting as an inlet for a laser gas mixture fed under pressure at a temperature higher than 1100° C., said duct also having three spaced-apart portions that extend across and along a common axis, the first one of said portions being close to the inlet and extending across the common axis, said first portion being devised to define a first laser-generating zone in which the laser gas mixture is made to laser, said first portion being also devised to form a first optical cavity comprising a first pair of opposite mirrors that are aligned with the common axis and adjusted to focus the coherent light that they collect, one of said mirrors of said first pair, viz. the one adjacent the second one of said portions, being a partial mirror to allow the coherent light generated and collected in the first zone to be transmitted toward the second one and third one of said portions along the common axis;

the second one of said portions being located past a divergent nozzle downstream of the first portion and also extending across the common axis, said second portion defining a second laser generating zone in which the laser gas mixture is made to laser by expansion, said second portion being also devised to form a second optical cavity comprising a second pair of opposite mirrors that are aligned with the common axis and adjusted to focus the coherent light that they collect, both of said mirrors of said second pair being partial mirrors to allow the coherent light collected in the first zone to enter the second zone and increase the coherent light collected in said second zone, and then the so-Increased coherent light to be transmitted to the third portion of the duct;

the third one of said portions being aligned with the common axis and oriented to face the first and second portions of said duct, said third portion being devised to form a third, axially elongated optical cavity comprising a third pair of mirrors that are aligned with the common axis and adjusted to focus the coherent light coming from the first and second zones into an axially positioned spot which ionized the gas mixture passing through said third portion and thus converting the same to a plasma, one of said mirrors of said third pair, viz. the one adjacent the second portion of the duct being a partial mirror to allow said coherent light to enter into the third portion;

a plurality of permanent magnets extending along said third portion of the duct, said magnets having positive and negative poles symmetrically positioned with respect to the common axis; and a plurality of electricity collecting plates extending along said third portion of the duct, said plates being grouped in pairs symmetrically positioned with respect to the common axis so as to be perpendicular to both the gas mixture flowing through the third portion of the duct along the common axis and the magnets, each of said plates being connectable to a load and supporting a winding also connectable to said load, whereby, in said third portion of the duct, electricity is generated in a very efficient manner by conventional magnetohydrodynamic action and simultaneously by Faraday effect.

2. The improved MHD generator of claim 1, wherein the first portion of said duct is connected to a radio-frequency generator in order to make the gas mixture to laser by electrical stimulation or radio-frequency induction in said first portion.

3. The improved MHD generator of claim 1, wherein the first portion of said duct is connected to a gas burner in order to make the gas mixture to laser by burning.

4. The improved MHD generator of claim 1, further comprising a gas control device including at least one gas sensor located within the duct in order to check the composition of the gas mixture and give a signal to control the same.

5. The improved MHD generator of claim 4, wherein the third portion of the duct has a narrowed cross-section in order to increase the density of the gas mixture passing through said the third portion.

6. The improved MHD generator of claim 4, wherein the third portion of the duct is provided with one or more additional gas injectors to increase the amount of gas passing through this third portion and protect the collecting plates.

7. The improved MHD generator of claim 1, wherein said laser gas mixture fed into the inlet of the duct is adjusted to contain from 88 to 89% $N_2$, from 8 to 10% $CO_2$ and less than 4% $H_2O$.

8. The improved MHD generator of claim 2, wherein said laser gas mixture fed into the inlet of the duct is adjusted to contain from 88 to 89% $N_2$, from 8 to 10% $CO_2$ and less than 4% $H_2O$.

9. The improved MHD generator of claim 3, wherein said laser gas mixture fed into the inlet of the duct is adjusted to contain from 88 to 89% $N_2$, from 8 to 10% $CO_2$ and less than 4% $H_2O$.

10. The improved MHD generator of claim 4, wherein said laser gas mixture fed into the inlet of the duct is adjusted to contain from 88 to 89% $N_2$, from 8 to 10% $CO_2$ and less than 4% $H_2O$.

11. The improved MHD generator of claim 5, wherein said laser gas mixture fed into the inlet of the duct is adjusted to contain from 88 to 89% $N_2$, from 8 to 10% $CO_2$ and less than 4% $H_2O$.

12. The improved MHD generator of claim 6, wherein said laser gas mixture fed into the inlet of the duct is adjusted to contain from 88 to 89% $N_2$, from 8 to 10% $CO_2$ and less than 4% $H_2O$.

13. A hybrid engine for converting the thermal energy of fuel and/or the thermal energy stored in air into electrical energy with a high thermodynamic efficiency and a high rate of energy conversion, comprising in combination:

(a) a closed cycle magnetohydrodynamic (MHD) electric generator system comprising, in series, an improved MHD generator and a compressor for feeding a laser gas mixture under pressure at a temperature higher than 1100° C., into the MHD generator via a heat exchanger, said system also comprising a laser gas chamber generator to generate the laser gas mixture and heat the same, means to adjust the concentration of the gas mixture within the closed cycle so that it contains from 88 to 89% $N_2$, from 8 to 10% $CO_2$ and less than 4% $H_2O$, and a scrubber; and (b) an open-cycle fuel engine comprising, in series, a combustion chamber through which air and fuel are burnt, the heat-exchanger of the MHD generator system and a heat-engine for operating the compressor of the MHD generator system, wherein said MHD generator comprises:

(a) a S-shaped duct having one end acting as an inlet for the laser gas mixture fed said duct also having three spaced-apart portions that extend across and along a common axis, the first one of said portions being close to the inlet and extending across the common axis, said first portion being connected to a gas burner and being devised to define a first laser-generating zone in which the laser gas mixture is made to laser, by burning said first portion being also devised to form a first optical cavity comprising a first pair of opposite mirrors that are aligned with the common axis and adjusted to focus the coherent light that they collect, one of said mirrors of said first pair, VIZ. the one adjacent the second one of said portions, being a partial mirror to allow the coherent light generated and collected in the first zone to be transmitted toward the second one and third one of said portions along the common axis;

the second one of said portions being located past a divergent nozzle downstream of the first portion and also extending across the common axis, said second portion defining a second laser generating zone in which the laser gas mixture is made to laser by expansion, said second portion being also devised to form a second optical cavity comprising a second pair of opposite mirrors that are aligned with the common axis and adjusted to focus the coherent light that they collect, both of said mirrors of said second pair being partial mirrors to allow the coherent light collected in the first zone to enter the second zone and increase the coherent light collected in said second zone, and then the so-increased coherent light to be transmitted to the third portion of the duct; the third one of said portions being aligned with the common axis and oriented to face the first and second portions of said duct, said third portion being devised to form a third, axially elongated optical cavity comprising a third pair of mirrors that are aligned with the common axis and adjusted to focus the coherent light coming from the first and second zones into an axially positioned spot which ionized the gas mixture passing through said third portion and thus converting the same to a plasma, one of said mirrors of said third pair, VIZ. the one adjacent the second portion of the duct being a partial mirror to allow said coherent light to enter into the third portion;

a plurality of permanent magnets extending along said third portion of the duct, said magnets having positive and negative poles symmetrically positioned with respect to the common axis; and a plurality of electricity collecting plates extending along said third portion of the duct, said plates being grouped in pairs symmetrically positioned with respect to the common axis so as to be perpendicular to both the gas mixture flowing through the third portion of the duct along the common axis and the magnets, each of said plates being connectable to a load and supporting a winding also connectable to said load, whereby, in said third portion of the duct, electricity is generated in a very efficient manner by conventional magnetohydrodynamic action and simultaneously by Faraday effect.

14. The hybrid engine of claim 13, wherein the fuel engine further comprises an air compressor also operated by the heat engine for compressing the air fed to the combustion chamber.

15. The hybrid engine of claim 14, wherein the heat engine is a turbine and this turbine, the air compressor and the compressor of the MHD generator system are mounted on a same shaft.

16. The hybrid engine of claim 15, wherein the MHD generator system comprises a turbine for recovering energy from the gas and supplying the so-recovered energy to the compressor of the MHD generator system, said turbine being mounted on the same shaft as said compressor.

* * * * *